(12) United States Patent  
Foura et al.

(10) Patent No.: US 12,373,889 B2  
(45) Date of Patent: Jul. 29, 2025

(54) ASSET TRACKING AND TRADING SYSTEM AND RELATED METHODS

(71) Applicant: Enyxus LLC, Sheridan, WY (US)

(72) Inventors: James A. Foura, Summerville, SC (US); Vincenzo Marrocco, Chicago, IL (US)

(73) Assignee: Enyxus LLC, Los Angeles, CA (US)

( * ) Notice: Subject to any disclaimer, the term of this patent is extended or adjusted under 35 U.S.C. 154(b) by 82 days.

(21) Appl. No.: 18/512,232

(22) Filed: Nov. 17, 2023

(65) Prior Publication Data

US 2024/0169433 A1 May 23, 2024

Related U.S. Application Data

(60) Provisional application No. 63/384,310, filed on Nov. 18, 2022.

(51) Int. Cl.  
*G06Q 40/04* (2012.01)

(52) U.S. Cl.  
CPC .................. *G06Q 40/04* (2013.01)

(58) Field of Classification Search  
CPC ..................................................... G06Q 40/04  
See application file for complete search history.

(56) References Cited

U.S. PATENT DOCUMENTS

| | | | |
|---|---|---|---|
| 2007/0005477 A1* | 1/2007 | McAtamney | G06Q 40/00 705/35 |
| 2015/0120524 A1 | 4/2015 | Domowitz et al. | |
| 2018/0350000 A1* | 12/2018 | Asllan | G06Q 40/04 |
| 2021/0056627 A1* | 2/2021 | Lee | G06Q 20/027 |

(Continued)

FOREIGN PATENT DOCUMENTS

| | | | | |
|---|---|---|---|---|
| EP | 3745343 A1 | * | 12/2020 | G06F 21/602 |
| WO | 2013007372 A1 | | 1/2013 | |

(Continued)

OTHER PUBLICATIONS

Harrison, Ben: Leveraging Data to Maintain Visibility on the Market and Firm-Wide Goals, Nov. 5, 2018, Blog, pp. 1-6. (Year: 2018).*

(Continued)

*Primary Examiner* — Bijendra K Shrestha  
(74) *Attorney, Agent, or Firm* — IPTechLaw

(57) ABSTRACT

Implementations of systems for tracking and trading assets may include an order book module configured to generate an order book, an exchange module configured to retrieve holdings information associated with a user, a tracking module configured to calculate a delta of a rate of exchange between two assets recorded within the order book, a block module configured to generate one or more blocks, each block representative of an asset of the first plurality of assets, and a trade module configured to transmit a trade request to the one of the brokerage, the exchange, or the brokerage and the exchange. The trade module may be configured to receive, from a user, a single trade request between a first asset and a second asset. The trade module may be configured to calculate a plurality of trade routes between the first asset and the second asset through one or more "medium" assets.

17 Claims, 14 Drawing Sheets

(56) References Cited

U.S. PATENT DOCUMENTS

2021/0192617 A1     6/2021     Foley et al.

FOREIGN PATENT DOCUMENTS

| WO | WO-2018128539 A1 * | 7/2018 | ............. G06F 21/64 |
| WO | 2022078303 A1 | 4/2022 | |

OTHER PUBLICATIONS

Oracle: Asset Tracking, User's Guide, Release 12.2, Part No. E048803-01, Sep. 2013, pp. 1-102 (Year: 2013).*

Javaid et al.: A Review of Blockchain Technology application for financial services, Sep. 29, 2022, Bench Council Transactions on Benchmarks, Standards and Evaluation, 2, 100073, pp. 1-18 (Year: 2022).*

Melker, S., "Day Trading Bitcoin: Why 95% of Traders Lose Money and Fail," Cointelegraph, Published Sep. 24, 2019, Website accessed Nov. 15, 2023, https://cointelegraph.com/news/day-trading-bitcoin-why-95-of-traders-lose-money-and-fail, pp. 1-8.

Duggan, W., "If You're Day Trading, You Will Probably Lose Money: Here's Why," Benzinga, Published Jul. 30, 2021, Website accessed Nov. 15, 2023, https://www.benzinga.com/analyst-ratings/analyst-color/21/07/22148207/if-youre-day-trading-you-will-probably-lose-money-heres-why, pp. 1-8.

Staff of Tradeciety, "Scientist Discovered Why Most Traders Lose Money—24 Surprising Statistics," Tradeciety, Published Feb. 5, 2019, Website accessed Nov. 15, 2023, https://tradeciety.com/24-statistics-why-most-traders-lose-money, pp. 1-13.

Chen, J. "What Is Relative Value? Definition, How to Measure It and Example," Investopedia, Published Jul. 20, 2022, Website accessed Nov. 15, 2023, https://www.investopedia.com/terms/r/relative-value.asp, pp. 1-7.

Staff of CFI, "Arbitrageur," CFI, Published 2015, Website accessed Nov. 15, 2023, https://corporatefinanceinstitute.com/resources/career-map/sell-side/capital-markets/arbitrageur/, pp. 1-7.

Hall, M., "Fractional Ownership: A Trendy Business Model That Might Be Having a Moment," Published Jul. 9, 2020, Website accessed Nov. 15, 2023, https://www.forbes.com/sites/markhall/2020/07/09/fractional-ownership/?sh=cabb8715ad38, pp. 1-5.

* cited by examiner

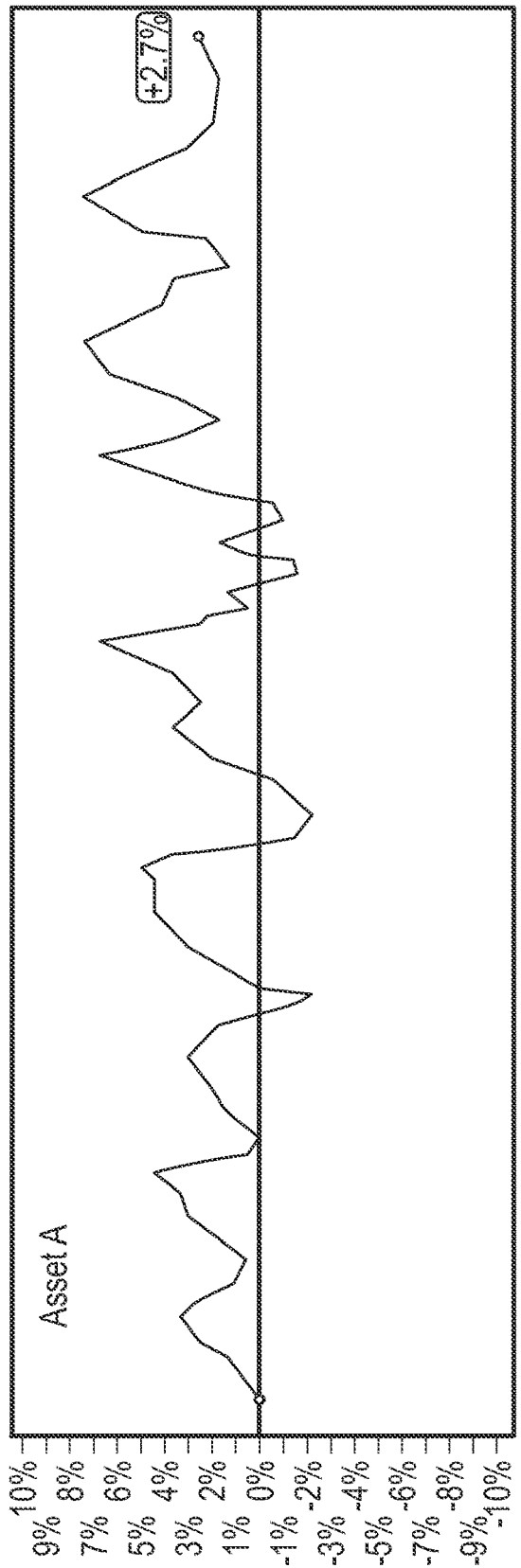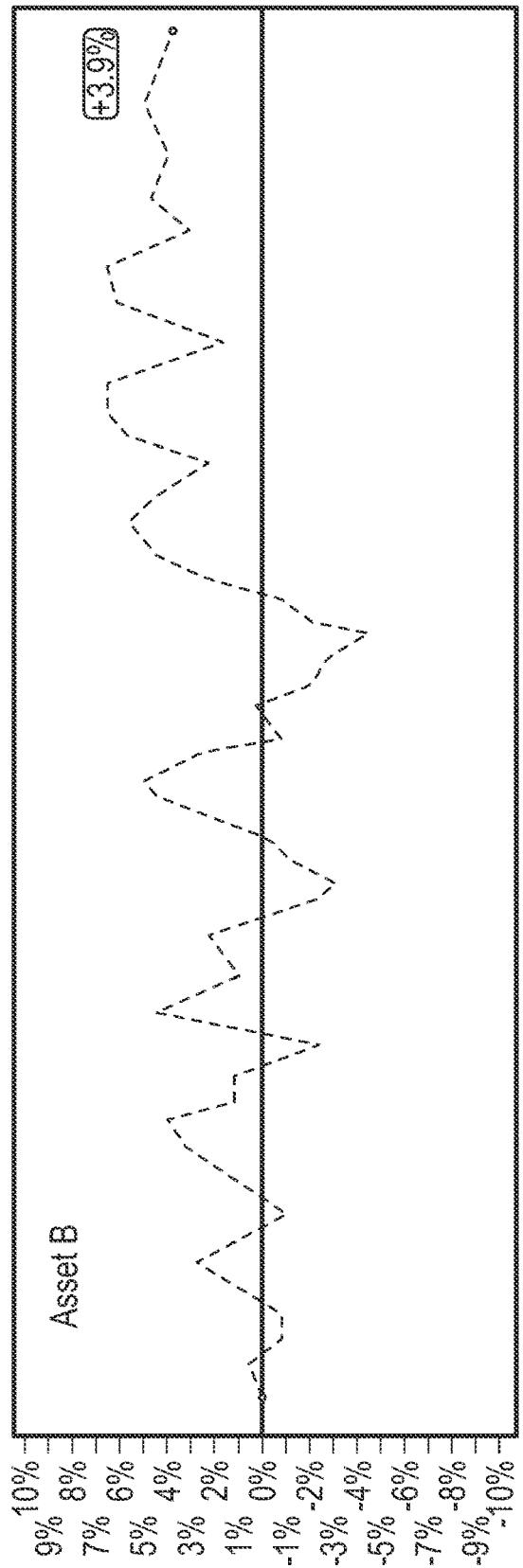

Global Portfolio $1,234,983.12 | Total Investment $40,000.00 | Market Value $68,398.34 | Accounts 6 | Symbols 34 | Blocks 519 | Trades 3,456 | Open Orders 7

Platform Portfolio Markets FAQ Support Blog Account

42

Holdings | Performance | 3D Pie Chart

| Asset | Quantity | Portfolio % | Entry Cost | Purchase Cost | Adjusted Cost | Average Price | Break Even | Last Price | Market Value | Gain /Loss | Trade |
|---|---|---|---|---|---|---|---|---|---|---|---|
| USD | $1,018,923.19 | 48.93% | $1,000,234.09 | $1,018,923.19 | $1,018,923.19 | — | — | Key Asset | $1,018,923.19 | — | ⇄ |
| BTC | 23.48904823 | 12.08% | $300,400.00 | $342,459.92 | $247,832.12 | $8,783.41 | $8,234.13 | $29,324.56 | $243,832.12 | -$2,374.43 | ⇄ |
| ETH | 1,234.09394873 | 14.73% | $60,000.00 | $98,283.93 | $92,883.92 | $579.23 | $542.45 | $247.15 | $94,883.92 | +$1,293.75 | ⇄ |
| XRP | 22,435.098083 | 9.85% | $71,000.00 | $74,983.21 | $71,324.98 | $0.234 | $0.193 | $41.98 | $70,324.98 | -$438.23 | ⇄ |
| EOS | 345.98342834 | 19.34% | $118,332.99 | $124,956.84 | $118,332.99 | $35.29 | $31.21 | $48.91 | $131,334.33 | -$12,432.19 | ⇄ |
| NEO | 0.98983299 | 4.53% | $191,112.23 | $196,432.76 | $191,112.23 | $29.73 | $25.44 | $21.98 | $191,021.23 | -$95.43 | ⇄ |
| DASH | 0.98734547 | 23.41% | $87,213.34 | $95,432.23 | $87,213.34 | $201.78 | $194.83 | $187.12 | $86,213.34 | -$601.19 | ⇄ |
| XMR | 103.09382721 | 11.21% | $27,266.31 | $28,324.22 | $27,266.31 | $201.78 | $194.83 | $187.12 | $29,266.31 | +$898.87 | ⇄ |

| Sub Totals > | Holdings 4/6 | 78.34% | $1,698,543.21 | $1,602,112.14 | $1,595,843.22 | | | Total Market Value: | $1,634,843.23 | +$32,983.45 | +23.82% |

FIG. 7

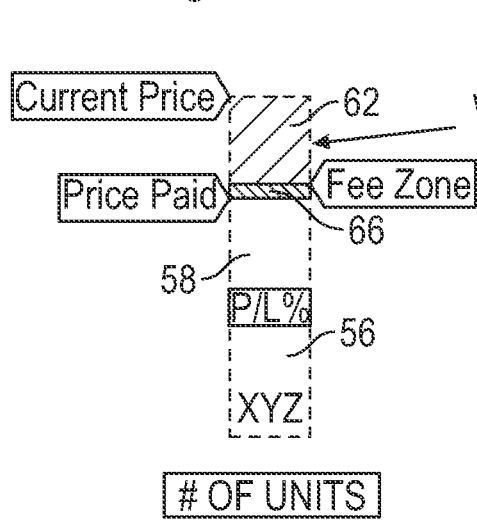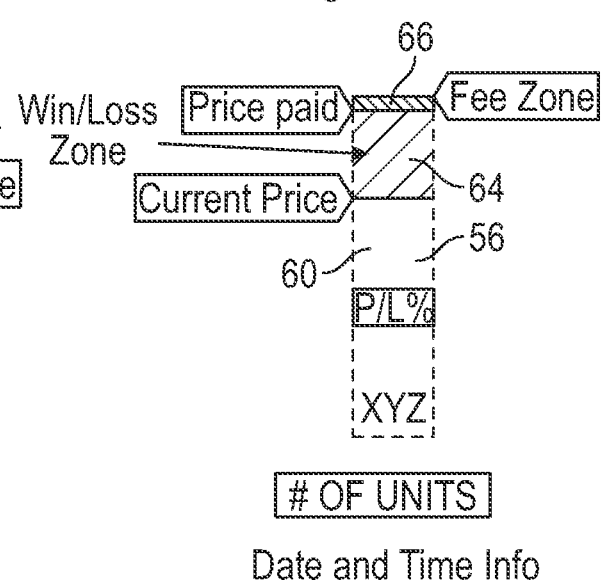
FIG. 10

| Current Merged Block Details | | | Tracking Value Metrics and Growth Metrics of a Merged Block | | | | | | | | | |
|---|---|---|---|---|---|---|---|---|---|---|---|---|
| | | | Value Metrics in USD | | | | | Growth Metrics in DEF | | | | |
| Block ID | Units | Ratio | Enter Value USD | Ratio | Price (USD) | Value (USD) | ROI ($) | ROI (%) | Enter Price DEF (USD) | Enter Value Units of DEF | Ratio | Unit Growth | Value if Held | PGI ($) | PGI (%) |
| B05 | 100 | 45.5% | $2,500 | 47.2% | $30 | $3,000 | $500 | 20.0% | $31 | 80.64516 | 48.7% | 19.35484 | $2,419 | $580.65 | 24.0% |
| B07 | 120 | 54.5% | $2,800 | 52.8% | $30 | $3,600 | $800 | 28.6% | $33 | 84.84848 | 51.3% | 35.15152 | $2,545 | $1,054.55 | 41.4% |
| B09 (Totals) | 220 | | $5,300 | | | $6,600 | $1,300 | 24.5% | $64 | 165.49365 | | 54.50632 | $4,965 | $1,635.19 | 32.9% |

| Comparing Equivalencies and Growth Metrics in Target Asset (ABC) ||||||||||||
| Merged DEF Block Current Value |||| Entry Value Metrics (in USD) |||| Growth Metrics in ABC |||||
| | | | | | | | | Entry Value Equivalency || | | Current Value Unit Growth Potential ||| Portfolio Growth Impact Calc. ||
| Block ID | Units | Current Price (USD) | Current Value (USD) | Entry Value USD | Entry Price DEF (USD) | Entry Value Units of DEF | Entry Price ABC (USD) | Entry Value Units of ABC | Ratio | Current Price | Potential Current Units | Unit Growth | Unit Growth (%) | Value if Held | PGI ($) | PGI (%) |
|---|---|---|---|---|---|---|---|---|---|---|---|---|---|---|---|---|
| B05 | 100 | $30 | $3,000 | $2,500 | $31 | 80.64516 | $4.50 | 555.55556 | 48.5% | $4.25 | 705.8824 | 150.32680 | 27.06% | $2,361 | $638.89 | 27.1% |
| B07 | 120 | $30 | $3,600 | $2,800 | $33 | 84.84848 | $4.75 | 589.47368 | 51.5% | $4.25 | 847.0588 | 257.58514 | 43.70% | $2,505 | $1,094.74 | 43.7% |
| B09 (Totals) | 220 | | $6,600 | $5,300 | | 165.49365 | $9.25 | 1145.02924 | | | 1552.941 | 407.91194 | 35.62% | $4,866 | $1,733.63 | 35.6% |

FIG. 14

Example of Equivalency Tracking Logic in Block Map

| Instances | Fiat (F) Value | Risk Asset A (Units) | Risk Asset B (Units) | Risk Asset C (Units) |
|---|---|---|---|---|
| Current | 13,500 | | | Holding: 65Units |
| Trade 3 | 12,000 | Potential: 1,250 units<br>Price: 1A = 10.8F | Potential: 1,085 units<br>Price: 1B = 12.44F | Holding: 65 units<br>Price: 1C = 184.62F |
| Trade 2 | 11,000 | Traded: 1,300 Units | Equivalency: 920 units<br>Price: 1B = 13.04F | Equivalency: 55 units<br>Price: 1C = 200F |
| Trade 1 | 10,500 | Holding: 1,300 units<br>Price: 1A = 8.46F | Traded: 880 units | |
| | | Traded: 1,000 units | Holding: 880 units<br>Price: 1B = 11.93F | Equivalency: 51 units<br>Price: 1C = 205.88F |
| Start | 10,000 | Holding: 1,000 units<br>Price: 1A = 10F | Equivalency: 800 units<br>Price: 1B = 12.50F | Equivalency: 50 units<br>Price: 1C = 200F |

Deposit/ API Connection Event

FIG. 15

ASSET TRACKING AND TRADING SYSTEM AND RELATED METHODS

CROSS REFERENCE TO RELATED APPLICATIONS

This document claims the benefit of the filing date of U.S. Provisional Patent Application 63/384,310, entitled "Asset Tracking and Trading System and Related Methods" to James Foura and Vincenzo Marrocco, which was filed on Nov. 18, 2022, the disclosure of which is hereby incorporated entirely herein by reference.

BACKGROUND

1. Technical Field

Aspects of this document relate generally to systems and methods for tracking and trading assets.

2. Background

Trading and investment activities include the purchase of an asset and either holding it or trading it. Assets can include currency, digital currency, or shares of a company. The value of these assets fluctuate with time. Depending upon how the values fluctuate, trading the assets at the right time can be profitable.

SUMMARY

Implementations of systems for tracking and trading assets may include an order book module configured to generate an order book, an exchange module configured to retrieve, through one or more application programming interfaces (API), holdings information associated with a user from either a brokerage, an exchange, or a brokerage and an exchange, a tracking module configured to calculate a delta of a rate of exchange between two assets recorded within the order book, a matrix module configured to generate a first graphical user interface (GUI) comprising a matrix wheel, the matrix wheel comprising a first plurality of assets and configured to display the delta of a rate of exchange between two assets of the first plurality of assets, a block module configured to generate one or more blocks, each block representative of an asset of the first plurality of assets, and a trade module configured to transmit a trade request to the one of the brokerage, the exchange, or the brokerage and the exchange. The trade module may be configured to receive, from a user, a single trade request between a first asset and a second asset. The trade module may be configured to calculate a plurality of trade routes between the first asset and the second asset through one or more "medium" assets. The trade module may be configured to determine a trade route resulting in the greatest number of second assets. The trade module may be configured to request a trade between the first asset and the one or more "medium" assets and also between the one or more "medium" assets and the second asset in order to execute the single trade request using the trade route resulting in the greatest number of second assets.

Implementations of systems for tracking and trading assets may include one, all, or any of the following:

The delta rate of exchange may be a rate of change of a trading price of assets over a specified period of time, between the assets.

The block module may be configured to generate a second GUI comprising a block map illustrating a trade history of the one or more blocks. The trade history may include a plurality of equivalency values between each block and the first plurality of assets.

The matrix module may be configured to generate a second GUI comprising a second wheel, the second wheel having a second plurality of assets.

Each block of the one or more blocks may be divided into child blocks. The value of each of the child blocks may be dependent upon when assets of the child blocks were purchased.

Each block of the one or more blocks may be merged with another block to form a parent block. The value of the parent block may be calculated based upon a value and origination time of each block within the parent block. Each block within the parent block may be independently tracked after the parent block is formed.

The trade route resulting in the greatest number of second assets may include a first trade between the first asset and a first "medium" asset, a second trade between the first "medium" asset and a second "medium" asset, and a third trade between the second "medium" asset and the second asset.

The trade module may be configured to subtract a cost of fees and order book consumption, in units of the second asset, when determining the trade route resulting in the greatest number of second assets.

Implementations of systems for tracking and trading assets may include an exchange module configured to retrieve, through one or more application programming interfaces (API), holdings information associated with a user from either a brokerage, an exchange, or a brokerage and an exchange, a tracking module configured to calculate a delta of a rate of exchange between two assets recorded within the order book, a block module configured to generate one or more blocks, each block representative of an asset of the first plurality of assets, and a trade module configured to transmit a trade request to the one of the brokerage, the exchange, or the brokerage and the exchange. The trade module may be configured to receive, from a user, a single trade request between a first asset and a second asset. The trade module may be configured to calculate a plurality of trade routes between the first asset and the second asset through one or more "medium" assets. The trade module may be configured to determine a trade route resulting in the greatest number of second assets. The trade module may be configured to request a trade between the first asset and the one or more "medium" assets and also between the one or more "medium" assets and the second asset in order to execute the single trade request using the trade route resulting in the greatest number of second assets.

Implementations of systems for tracking and trading assets may include one, all, or any of the following:

The delta rate of exchange may be a rate of change of a trading price of assets over a specified period of time, between the assets.

Each block of the one or more blocks may be divided into child blocks. A value of each of the child blocks may be dependent upon when assets of the child blocks were purchased.

Each block of the one or more blocks may be merged with another block to form a parent block. The value of the parent block may be calculated based upon a value and origination time of each block within the parent block. Each block within the parent block may be independently tracked after the parent block is formed.

The trade route resulting in the greatest number of second assets may include a first trade between the first asset and a first "medium" asset, a second trade between the first "medium" asset and a second "medium" asset, and a third trade between the second "medium" asset and the second asset.

Implementations of methods of tracking and trading assets may include using an order book module, generating an order book. Implementations may include using an exchange module and one or more application programming interfaces (API), retrieving holdings information associated with a user from one of a brokerage server, an exchange server, or both the brokerage server and the exchange server. Implementations may include calculating, through a tracking module, a delta of a rate of exchange between assets of the order book. Implementations may include generating, through a matrix module, a graphical user interface (GUI) having a matrix wheel, the matrix wheel including a first plurality of assets and configured to display the delta rate of exchange between any two assets of the first plurality of assets. Implementations may include generating, through a block module, one or more blocks, each block representative of an asset of the first plurality of assets. Implementations may include receiving a single trade request from a user between a first asset and a second asset. Implementations may include calculating, using a trade module, a plurality of trade routes between the first asset and the second asset through one or more "medium" assets. Implementations may include determining, using the trade module, a trade route resulting in the greatest number of second assets. Implementations may include transmitting a trade request corresponding to the trade route resulting in the greatest number of second assets, through a trade module, to one of the brokerage server, the exchange server, or both the brokerage server and the exchange server, the trade request including a first trade between the first asset and the one or more "medium" assets and a second trade between the one or more "medium" assets and the second asset.

Implementations of methods of tracking and trading assets may include one, all, or any of the following:

Calculating the delta rate of exchange may include comparing a rate of change between assets over a specified time period.

The trade request may include trades at either multiple brokerages, multiple exchanges, or brokerages and exchanges.

Implementations of the method may include dividing a block, through the block module, into two or more child blocks.

Implementations of the method may include merging two or more blocks into a single parent block and continuing to track the value of each of the two or more blocks after the formation of the single parent block.

The trade module may subtract a cost of fees and order book consumption, in units of the second asset, when determining the trade route resulting in the greatest number of second assets.

The trade request may include a trade between the first asset and a first "medium" asset, a trade between the first "medium" asset and a second "medium" asset, and a trade between the second "medium" asset and the second asset.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3 is a chart illustrating performance of asset A;

FIG. 4 is a chart illustrating performance of asset B;

FIG. 7 is an illustration of a graphical user interface (GUI) displaying a table of assets;

FIG. 10 is a diagram of two blocks;

FIG. 14 is a table illustrating information associated with the merged block and a separate "to" asset;

FIG. 15 is an illustrated of a block map;

DESCRIPTION

This disclosure, its aspects and implementations, are not limited to the specific components, assembly procedures or method elements disclosed herein. Many additional components, assembly procedures and/or method elements known in the art consistent with the intended asset tracking and trading systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such asset tracking and trading systems, and implementing components and methods, consistent with the intended operation and methods.

Figure 1:
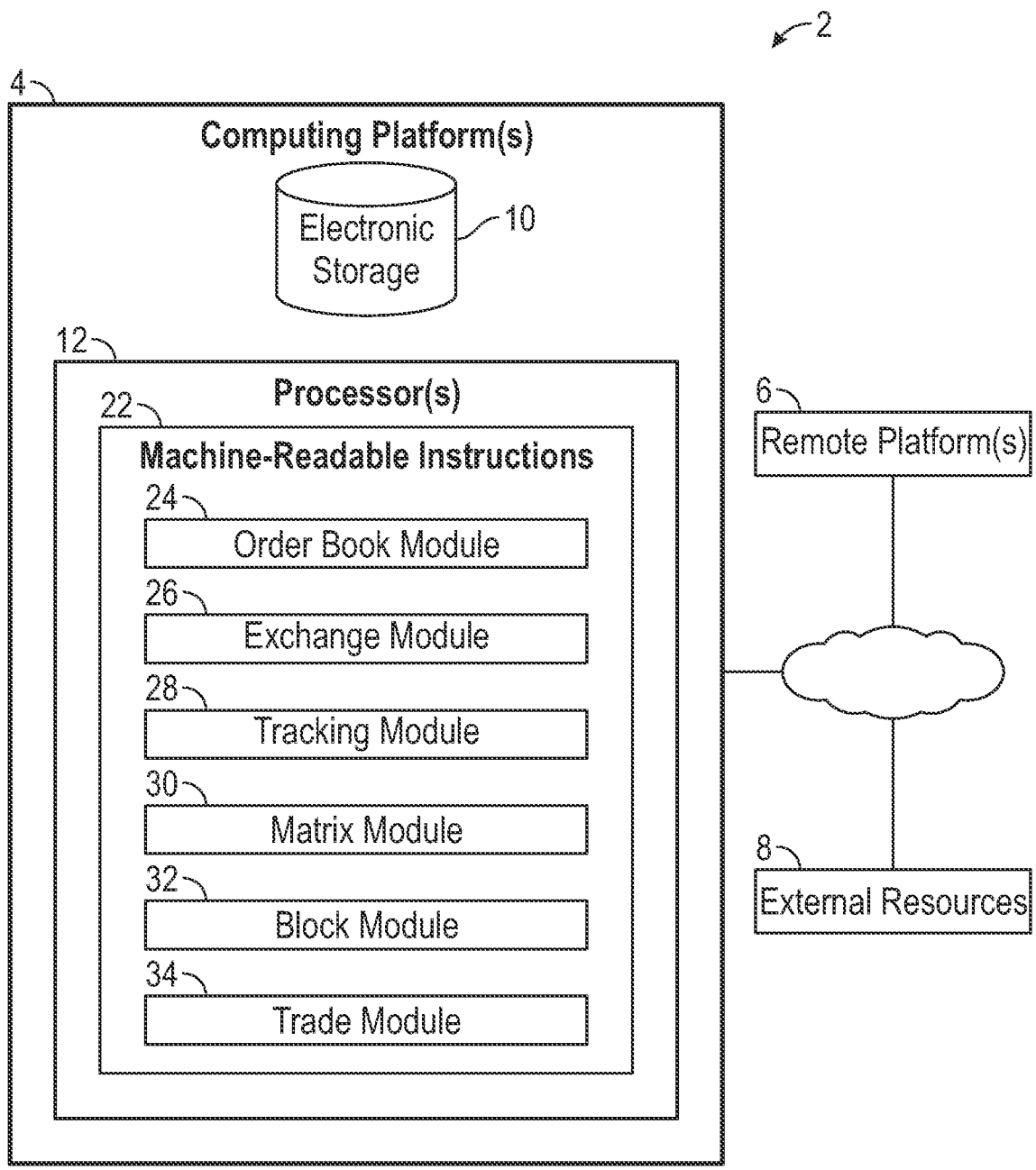
FIG. 1 is a schematic of a system configured for tracking and trading assets.

Referring to FIG. 1, a schematic of a system configured for tracking and trading assets is illustrated, in accordance with one or more implementations. In various implementations, the system 2 may be a web-based system configured to run on the web. In various implementations, and as illustrated by FIG. 1, the system 2 may include one or more computing platforms 4 operatively coupled to one or more remote platforms 6. The computing platform(s) 4 may also be operatively coupled to additional external resources 8. The computing platform(s) 4 may serve as a bridge between the operating system or database of the computing platforms and the remote platforms 6 and external resources 8. Computing platform(s) 4 may be configured to communicate with one or more remote platforms 6 according to a client/server architecture, a peer-to-peer architecture, and/or other architectures. Users may access the system 2 via remote platform(s) 6. As used herein, "user" and "trader" are both terms for individuals who utilize the system to track and/or trade assets. In various implementations, the remote platform 6 may be a computing device. In such implementations, the remote platform 6 may include one or more processors (which may be hardware processors) configured to execute computer program modules. The computer program modules may be configured to enable a user associated with the given remote platform to interface with system 2 and/or external resources 8, and/or provide other functionality attributed herein to remote platform(s) 6. Remote platform(s) 6 may be configured to communicate with other remote platforms via computing platform(s) 4 and/or according to a client/server architecture, a peer-to-peer architecture, and/or other architectures. By way of non-limiting example, a given remote platform and/or a given computing platform may include one or more of a server, a desktop computer, a laptop computer, a handheld computer, a tablet computing platform, a NetBook, a Smartphone, a gaming console, and/or other computing platforms. In particular implementations, computing platform(s) 4 may include a web server. Computing platform(s) 4 may include a plurality of hardware, software, and/or firmware components operating together to provide the functionality attributed herein to computing platform(s). For example, computing platform(s) 4 may be implemented by a cloud of computing platforms operating together as computing platform(s).

Figure 2:
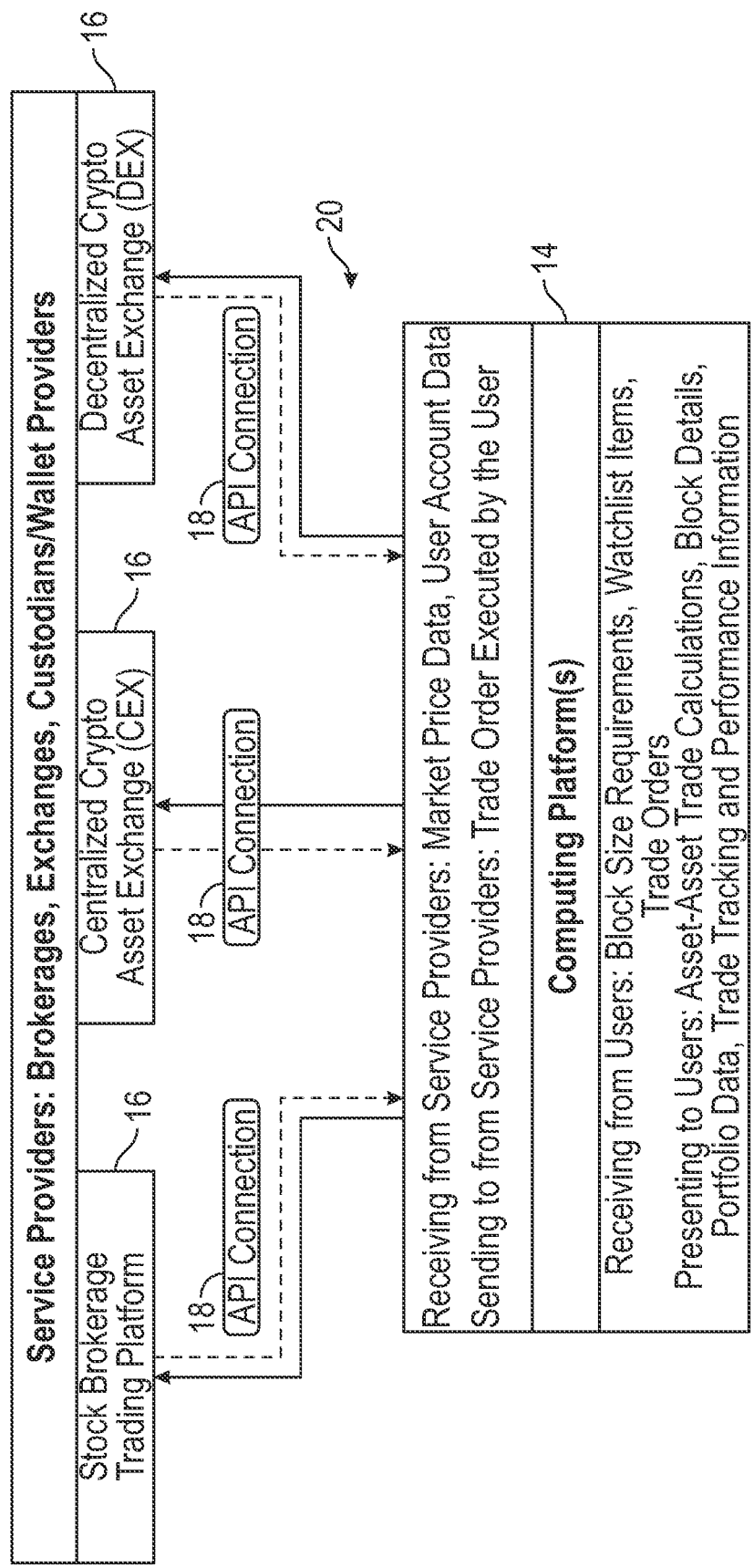
FIG. 2 is a schematic of an example of a computing platform coupled to a plurality of external resources.

Referring to FIG. 2, a schematic of an example of a computing platform coupled to a plurality of external resources is illustrated. In various implementations, the computing platform 14 may be operatively coupled to one or more external resources 16. The external resources 16 may be service providers. In particular implementations, the external resources 16 may include, by non-limiting example, brokerages, exchanges, or custodian/wallet providers. As illustrated by FIG. 2, the computing platform may be securely and operatively coupled to one or more external resources 16 through one or more application program interfaces (API) 18. The system 20 of FIG. 2 allows for the visibility and functionality for users of the systems disclosed herein while working within the framework of the brokerages, exchanges, or other service providers where users maintain funded accounts.

Referring back to FIG. 1, computing platform(s) 4 may include electronic storage 10, one or more processors 12, and/or other components. Computing platform(s) 4 may include communication lines, or ports to enable the exchange of information with a network and/or other computing platforms. Illustration of computing platform(s) 4 in FIG. 1 is not intended to be limiting.

In various implementations, the electronic storage 10 may include a database. Electronic storage 10 may comprise non-transitory storage media that electronically stores information. The electronic storage media of electronic storage 10 may include one or both of system storage that is provided integrally (i.e., substantially non-removable) with computing platform(s) 4 and/or removable storage that is removably connectable to computing platform(s) via, for example, a port (e.g., a USB port, a firewire port, etc.) or a drive (e.g., a disk drive, etc.). Electronic storage 10 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 10 may include one or more virtual storage resources (e.g., cloud storage, a virtual private network, and/or other virtual storage resources). Electronic storage 10 may store software algorithms, information determined by processor(s) 12, information received from computing platform(s) 4, information received from remote platform(s) 6, and/or other information that enables computing platform(s) 4 to function as described herein.

Processor(s) 12 may be configured to provide information processing capabilities in computing platform(s) 4. As such, processor(s) 12 may include one or more of a digital processor, an analog processor, a digital circuit designed to process information, an analog circuit designed to process information, a state machine, and/or other mechanisms for electronically processing information. Although processor(s) 12 is shown in FIG. 1 as a single entity, this is for illustrative purposes only. In some implementations, processor(s) 12 may include a plurality of processing units. These processing units may be physically located within the same device, or processor(s) 12 may represent processing functionality of a plurality of devices operating in coordination. Processor(s) 12 may be configured to execute modules (including any modules disclosed herein, including an order book module 24, an exchange module 26, a tracking module 28, a matrix module 30, a block module 32, a trade module 34, and/or other modules). Processor(s) 12 may be configured to execute any such modules by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components. In various implementations, multiple modules may share common components.

It should be appreciated that although modules illustrated by FIG. 1 are illustrated as being implemented within a single processing unit, in implementations in which processor(s) 12 includes multiple processing units, one or more of the modules illustrated by FIG. 1 may be implemented remotely from the other modules.

Computing platform(s) 4 may be configured by machine-readable instructions 22. Machine-readable instructions 22 may include one or more instruction modules. Likewise, in implementations where the computing platform(s) include a web server, the web server may also include the one or more instruction modules. The instruction modules may include computer program modules. The instruction modules may include one or more of an order book module 24, an exchange module 26, a tracking module 28, a matrix module 30, a block module 32, a trade module 34, and/or other instruction modules. Any of the modules may be configured to generate, or contribute to the generation, of any of the graphical user interfaces (GUI) of the system.

Still referring to FIG. 1, the system 2 may include an order book module 24. The order book module 24 may be configured to communicatively couple with an external resource, such as a third-party brokerage server, exchange server, or other external resource having an order book or order book information. The order book module 24 may be configured to receive information, including, by non-limiting example, the assets and prices of assets, from the external resource. In various implementations, the order book module 24 may include an API configured to access the order book information from the external resource. The order book module 24 is configured to generate an order book based on the order book information accessed. In various implementations, the order book module 24 may be configured to communicatively couple and receive or access information from multiple external resources to generate the order book. In various implementations, the order book module 24 may ensure that the generated order book is updated and reflects the most recent order book information.

In various implementations, the order book module 24 may be configured to add additional information not received from an external resource (such as, for example, manual edits by a user).

Still referring to FIG. 1, the system 2 may include an exchange module 26. The exchange module 26 is configured to communicatively couple with one or more brokerages, exchanges, or other service providers by coupling to the brokerage, exchange, or other service provider servers. In various implementations, the user has accounts at the brokerages, exchanges, or other service providers. In such implementations, the exchange module 26 is configured to receive or access information including, by non-limiting example, holdings information associated with the user's trading account at the brokerage, exchange, or other service provider. In various implementations (and as illustrated by FIG. 2), the exchange module 26 includes an API configured to access the holdings information and/or other information from the external resources. In various implementations, the exchange module 26 may be configured to regularly receive or access the holdings information and/or other information to ensure that the system includes the most recent information related to a user's trading accounts.

In various implementations, the order book module 24 and the exchange module 26 may be included in a single module. In other implementations they may be separate modules. In still other implementations, the order book module 24 and exchange module 26 may share common elements.

Still referring to FIG. 1, the system 2 may include a tracking module 28. The tracking module 28 may be configured to track prices of assets within the order book compared to other assets within the order book. As used herein, this tracking may be referred to as "equivalency tracking." In particular implementations, the tracking module may be configured to calculate the delta rate of exchange, or the rate of change of a trading price in the equivalent values of assets over a specified period of time, between the assets. In such implementations, the system 2 provides the ability to see change in the relative values of any asset against any other asset a user may wish to acquire, over any time frame. In such implementations, the tracking module may be configured to calculate the delta rate of exchange of assets over a calendrical time frame such as a 24 hour period, 3 day period, 1 week period, or any other period of time. The tracking module may also be configured to calculate the delta rate of exchange of assets over other time frames, such as, by non-limiting example, the date/time of the last trade made into the asset(s) held, the date/time of the start of trading, the date/time of the last trade at which the realization of the greatest number of units of any particular asset was achievable (an "all-time-high" reference that is asset specific rather than time specific), or any other time frame. The delta rate of exchange may be expressed as a percentage. Examples of these delta rates of exchange are further illustrated in conjunction with the matrix module disclosed herein. In various implementations, the matrix module and the tracking module may be included in the same module. In other implementations, these modules may be different modules. In still other implementations, these modules may share common elements with one another.

Figure 5:
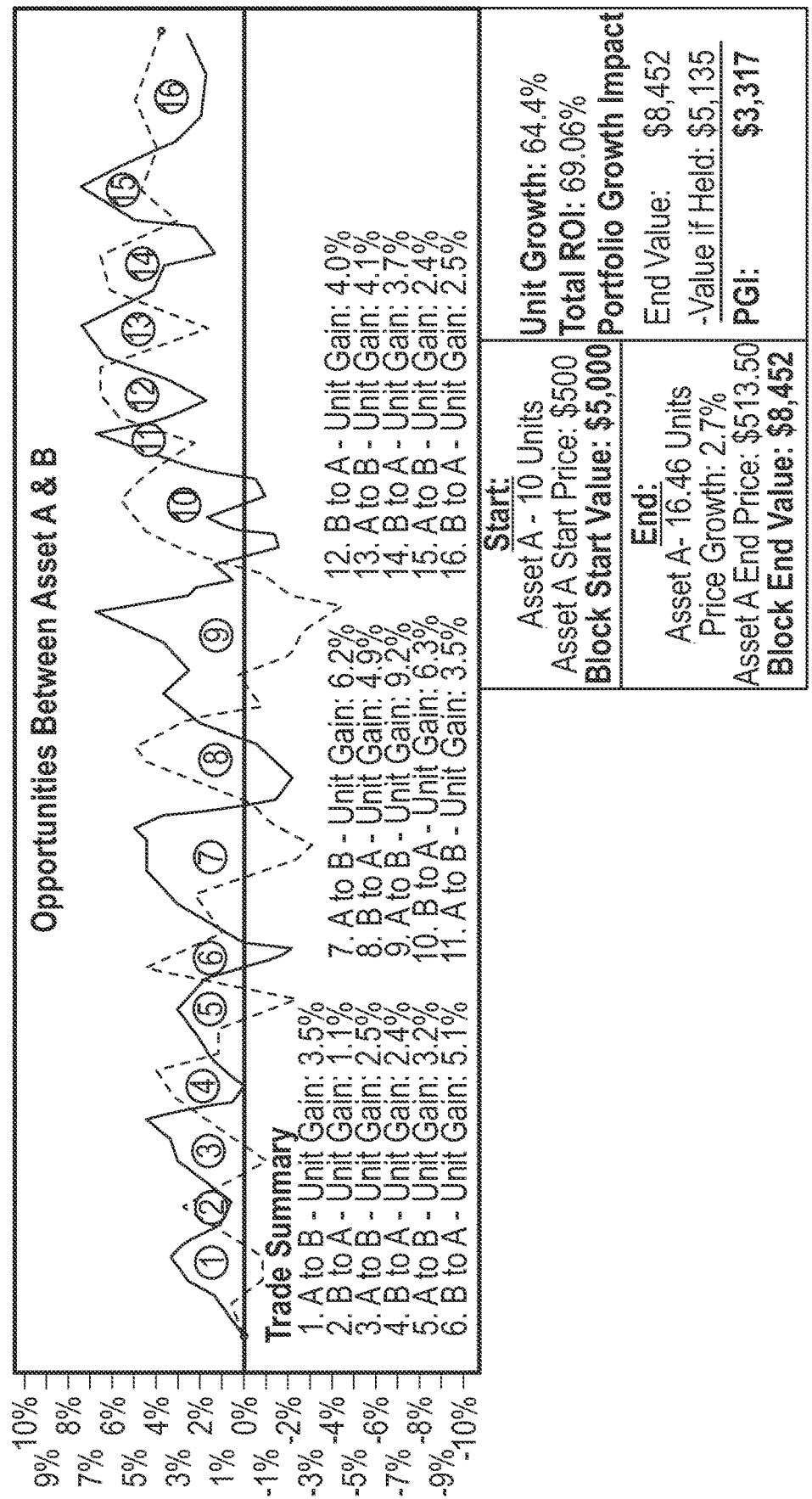
FIG. 5 is a chart comparing the performance of asset A and asset B.
Figure 6:
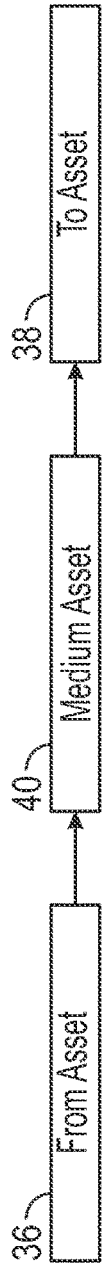
FIG. 6 is a diagram illustrating the transaction between a "from" asset and a "to" asset.

By tracking the delta rate of exchange between assets, the tracking module 28 provides visibility to users that allows the user to immediately identify opportunities to make trades "from" assets they hold "to" assets in their watchlist, which can result in more units of the assets they want to hold over the time frame specified. In turn, the tracking module 28 may allow users to grow their portfolios using assets they already have to fund the acquisition of other assets. FIGS. 3-5 illustrate an example of the visibility provided by the tracking module and how it may lead to portfolio growth.

Referring to FIG. 3 a chart illustrating performance of asset A is illustrated. As illustrated, the end price growth of asset A is 2.7%. If asset A were acquired and held, the user would experience a growth of 2.7%. Referring to FIG. 4, a chart illustrating performance of asset B is illustrated. The end price growth of asset B is 3.9%. Referring to FIG. 5 a chart comparing the performance of asset A and asset B is illustrated. As illustrated by FIG. 5, opportunities for unit gains between asset A and asset B are illustrated. By exposing these opportunities, a user may be able to make numerous trades as set forth in the trade summary of FIG. 5 to increase their number of units. In the particular implementation illustrated by FIG. 5, by making the numerous trades in the trade summary a user may obtain a unit growth of 64.6% resulting in a return on investment (ROI) of 69.04%. Implementations of the systems disclosed herein track value movement and facilitate a unit-accumulation approach to investing and trading.

In various implementations, the tracking module 28 may also be configured to track prices of assets in fiat currencies (such as USD or other market tokens offered by exchanges).

In various implementations, the tracking module 28 may be configured to calculate relative pricing between an asset that is held (a "from" asset) and an asset that could be acquired (a "to" asset). Referring to FIG. 3, a diagram illustrating the transaction between a "from" asset and a "to" asset is illustrated. In various implementations, a direct transaction between the "from" asset 36 and the "to" asset 38 may not be possible. In such implementations, a fiat currency (which may include, by non-limiting example, USD) may serve as a "medium" asset 40, or the middle asset that connects the trade between the "from" asset and the "to" asset. The relative pricing between the "from" asset and the "to" asset may be calculated using Equation 1, where Fp is the price of one unit of the "from" asset (the asset we are considering for disposition) expressed in fiat currency (p), Tp is the price of one unit of the "to" asset (the asset we are considering for acquisition) expressed in fiat currency (p), and Tf is the price of one unit of the "to" asset (the asset we are considering for acquisition) expressed in units of the "from" asset.

$$Tf = \frac{1(Fp)}{1(Tp)} \qquad \text{Equation 1}$$

In various implementations the tracking module 28 may be configured to track information associated with a block, or a particular asset or portion of an asset purchased at a particular time. In such implementations, the tracking module 28 may be configured to track or calculate, by non-limiting example, a price paid for a block at the inception of the block, the percent gain or loss that the block is currently experiencing, the break-even price for the block, the date upon which the block was created, the value associated with a merged block, the value associated with a spit block, the value of individual blocks used to form a merged block, or any other measure disclosed herein.

In various implementations, the tracking module 28 may be configured to recalculate values associated with blocks based upon profits or losses made when closing trades of blocks of the same asset. In such implementations, this may help a user maintain a better understanding of their true exposure as trades of the same asset are opened and closed incrementally, as blocks. As used herein, a "block" is a trackable value expressed as a quantity of a tradable asset held by the user. As this trackable value is traded into another asset or split or merged with other blocks, the entire history of the block of value is maintained for reference by the user. A block can represent an entirety of a single asset's inventory, or just a piece of it.

In various implementations, the tracking module 28 may be configured to track an entire history of an individual block as it traveled from one asset to another. In such implementations, the tracking module maintains a record of equivalent values in other assets the trader has chosen to evaluate, by non-limiting example, at the time of each trade, at the time of inception of the block, and the present time at which the user reviews the blocks' trade opportunities.

In various implementations, the block module 32 and the tracking module 28 may be included in the same module. In other implementations, these modules may be different modules. In still other implementations, these modules may share common elements with one another.

In various implementations, the tracking module 28 may be configured to track any other piece of information disclosed herein. Referring to FIG. 7, an illustration of a GUI displaying a table of assets is illustrated. In various implementations, the data tracked by the tracking module 28 may be organized and placed into a table 42. In various implementations, the table may be assembled by tracking module 28, the exchange module 26, or both the tracking and the exchange module.

The tracking module 28 may assist a user in obtaining larger quantities of assets by reallocating capital from higher priced assets to lower priced assets rather than focusing purely on the overall value of the account.

Still referring to FIG. 1, the system may include a matrix module 30. As described herein, the matrix module may facilitate the finding of trading opportunities among an array of chosen assets. In various implementations, the matrix module 30 may be configured to generate one or more GUIs utilizing the information calculated or tracked by the tracking module. Such GUIs may enable a user to find unit growth opportunities that would otherwise not be apparent.

Figure 8:
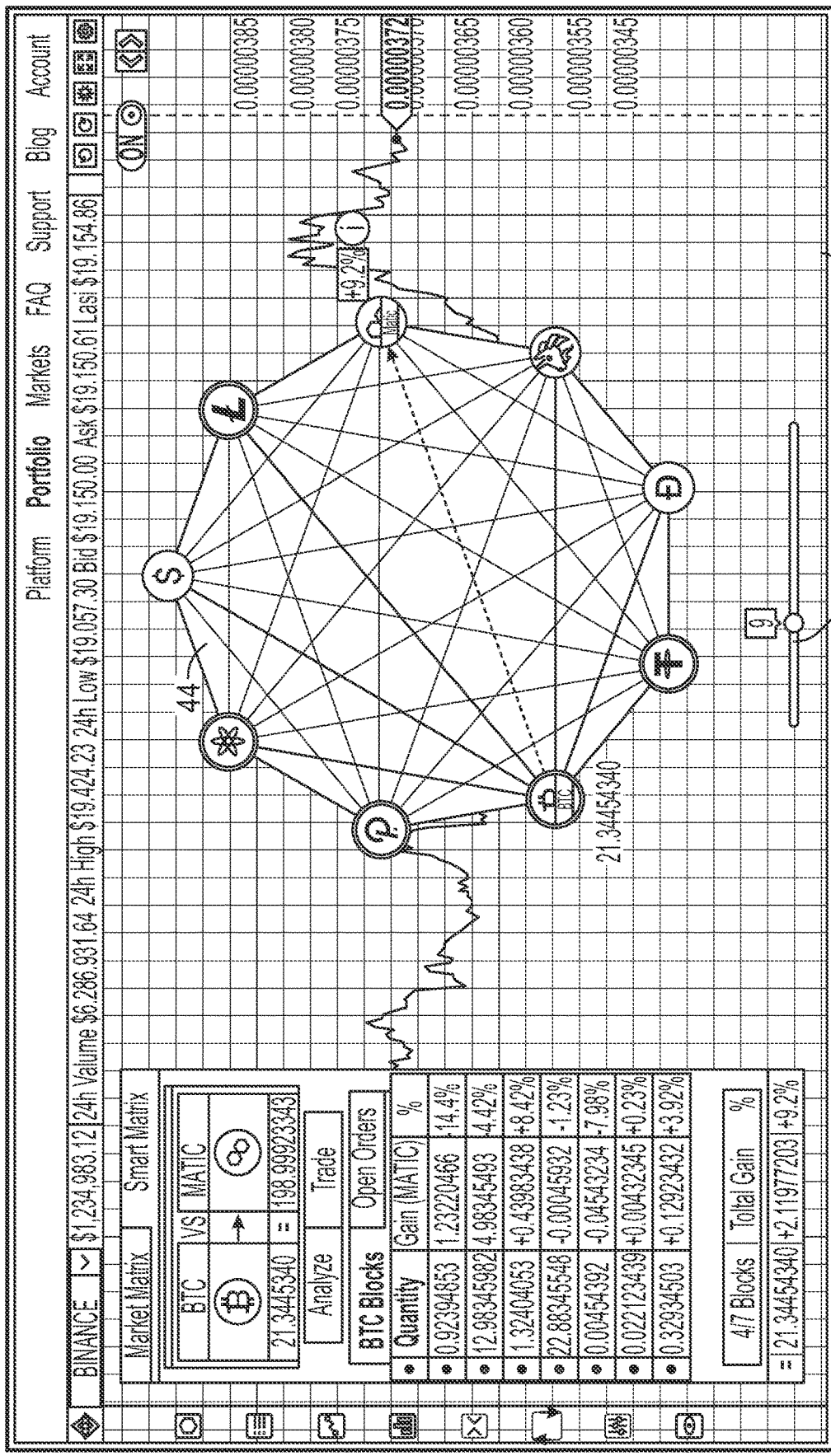
FIG. 8 is an illustration of a matrix wheel displayed on a GUI.

Referring to FIG. 8, a matrix wheel displayed on a GUI is illustrated. In various implementations, the matrix module 30 may be configured to generate a global market matrix GUI displaying a global market matrix wheel. The global market matrix wheel may appear similar to the matrix wheel 44 of FIG. 8. The global market matrix may include a matrix wheel made up of different assets. In various implementations, the matrix module may be configured to generate a global market matrix including the top 20 assets (by market cap) including USD (or the user's selected key asset), compared to one another, in terms of 1-week price movement differences, expressed as a percentage. In other implementations the matrix module may be configured to generate a global market matrix including fewer than the top 20 assets or more than the top 20 assets. Further, in other implementations the matrix module may be configured to generate a global market matrix in other terms different from a 1-week price move differences.

In various implementations, the matrix module 30 may be configured to generate a smart matrix GUI 46 as illustrated by FIG. 8. The matrix module 30 may be configured to generate the smart matrix GUI 46 with the global market matrix GUI. In other implementations, the matrix module may be configured to generate just the smart matrix GUI or just the global market matrix GUI. In implementations where the matrix module is configured to generate the smart matrix GUI 46, the matrix module may be configured to receive asset requests from a user and generate a matrix wheel 44 having one or more assets selected by the user. The custom matrix wheel 44 displayed in the smart matrix GUI 46 may be edited by a user selecting different assets or requesting the matrix module 30 display different pieces of information (including any information disclosed herein) associated with the selected assets. In implementations having the exchange module 26 that retrieves or accesses the user's holdings information, the matrix module 30 may automatically populate the smart matrix GUI 52 with the user's assets. In various implementations, multiple smart matrices (and corresponding GUIs) corresponding to multiple exchanges may be generated.

In various implementations, the matrix module 30 may be configured to receive a request from a user to add watch list assets to the smart matrix. Watch list assets are assets not held by the user but that the user would like to watch and compare against their currently held assets. The smart matrix GUI 52 generated by the matrix module 30 is configured to display the assets compared to one another, in terms of 1-week price movement differences (or any other time period selected by the user), expressed as a percentage. In the smart matrix GUI, the "from" asset may be required to be an asset held by the user. The "to" asset can be any other asset.

In various implementations, the time period of the price difference for either the global market matrix or the smart market matrix may be selected by the user, and, by non-limiting example, may include any time period disclosed herein. In various implementations the matrix module may be configured to show 9 assets in the wheel but a user may be able to reduce the number of assets all the way to two assets or expand the number of assets to a max of 21 assets. In other implementations the matrix module may be configured to generate GUIs having a matrix wheel with more than 21 assets.

Figure 9:
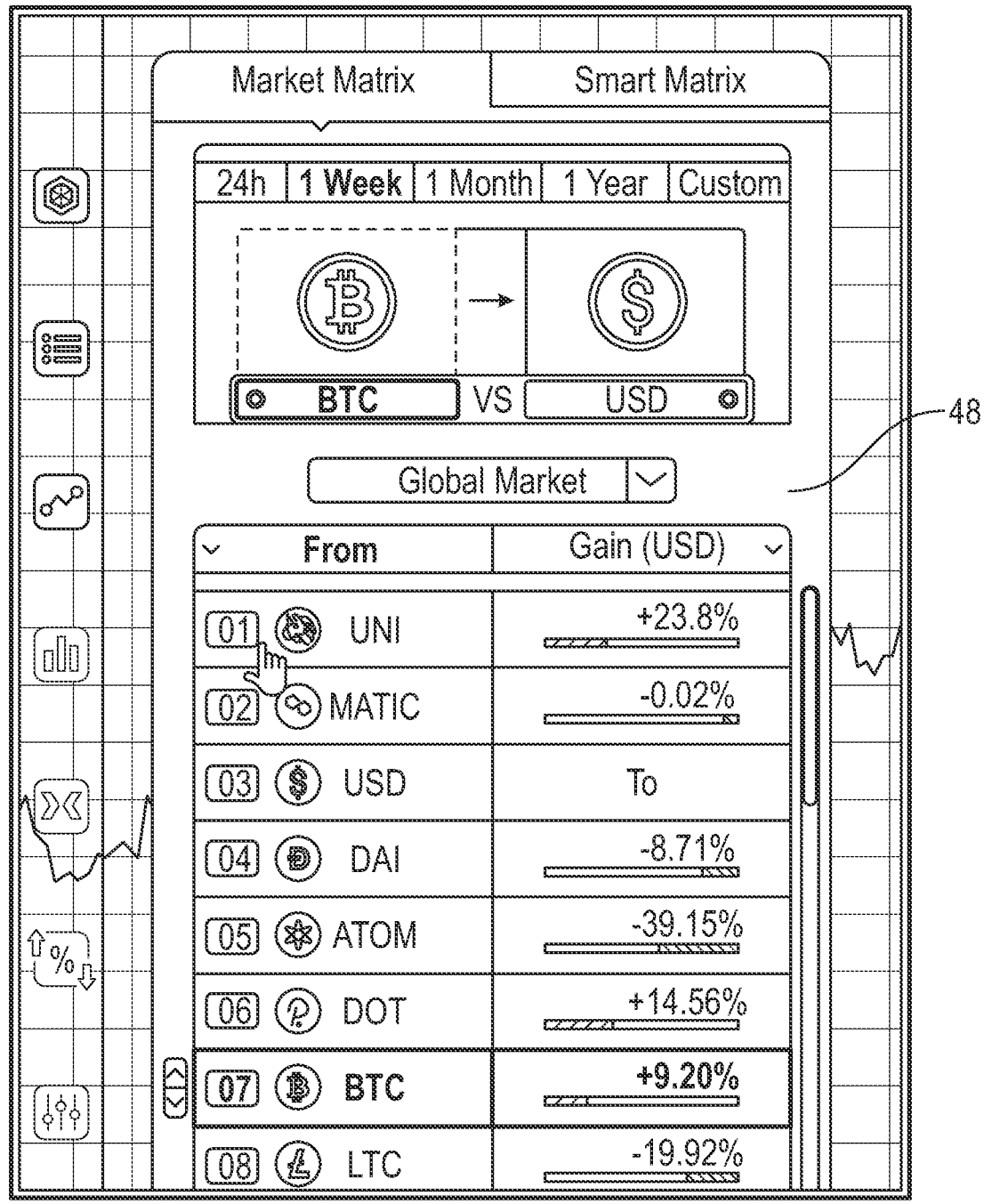
FIG. 9 is an illustration of a matrix table displayed on a GUI.

Referring to FIG. 9, an illustration of a matrix table displayed on a GUI is illustrated. The GUIs generated by the matrix module may also include a table 48 which includes information, such as the gain/loss, for the assets displayed in the table. The matrix module 30 may be configured to generate a global market matrix table corresponding to the global market matrix or a smart matrix table corresponding to the smart matrix. A user may be able to select assets within the table to display further information. In implementations where a held asset is selected, the matrix module may display all of the blocks in that holding, their gain/loss in units in whatever the "to" asset that has been selected indicates, the % gain or loss, and/or any other piece of information. Referring back to FIG. 8, in various implementations a user may be able to expand the number of assets in the wheel by using the slider 50 below the wheel. In such implementations, all of the assets originally included in the table will remain in the table but only the assets displayed in the wheel will be highlighted in the table.

The table 48, as illustrated by FIG. 9, includes a "from" asset, illustrated as BTC in FIG. 9, and a "to" asset illustrated as USD. The corresponding matrix wheel in the GUI includes lines extending from the selected "from" asset to the remaining assets. Though not illustrated by FIG. 5, when a user selects a particular asset as a "to" asset as illustrated by FIG. 9, the line between the "from" asset and the "to" asset in the matrix wheel may be highlighted and the comparison value is displayed.

The matrix module 30, and the generation of the matrix wheels and tables described herein, allow a user to see opportunities for unit gains inasmuch as the asset-to-asset delta rate of exchange may be expressed to the user. In such implementations, if the market is dropping for all assets, rather than holding all assets or dumping all assets, a user may be able to quickly see how assets are dropping as compared to other assets and still make positive trades to increase their unit gain despite the market dropping for both assets.

Still referring to FIG. 1, the system may include a block module 32 in addition to the matrix module 30. In other implementations, the system may include just one of the block module 32 or the matrix module 30.

In implementations including the block module 32, the block module may be configured to generate one or more GUIs having information calculated and tracked by the tracking module that allows users to manage their inventory with increased flexibility.

Referring specifically to FIG. 10, a diagram of two blocks is illustrated. The block module may be configured to receive a request from a user to generate one or more blocks 56 and compare the one or more blocks to an asset. A block can represent the entirety of an asset's inventory or just a piece of it. In various implementations, a block cannot contain more than one asset type within it. The block module may be configured to generate a block that serves as a graphical depiction of each or any asset. In various implementations, the blocks may also be represented individually by other modules (such as the matrix module 30).

FIG. 10 illustrates a block 58 that is in profit against a "to" asset and a block 60 that is in loss against a "to" asset. While FIG. 10 illustrates two blocks, the block module may be configured to generate and display more than two blocks. In particular implementations, the block module may be configured to generate a block for each block included within any of the matrix wheels disclosed herein. The block height at inception is based on the price paid for the block, or in the case of a block that represents a "time entity", the value at the time of recognition by the system 2. As the market price of the asset increases against any other asset to which it is being compared, a space 62 forms over the top of the block 58 to illustrate the growth in value. Conversely, as the market price of the asset decreases against any other asset to which it is compared, a space 64 forms at the top of the block 60, down to the current price to illustrate the loss in value against the other asset to which the block is being compared. In various implementations the blocks 56 may also illustrate a fee zone 66 which indicates how the fees in trading the asset will effect the value of the trade. The blocks 56 may also clearly display the name of the asset, as well as the number of units of that asset that the block represents. As additional blocks are created, either through additional purchases of the asset or by the splitting of a block, the additional blocks may be presented similar to the blocks 56 of FIG. 10.

In various implementations, additional details of the blocks may be configured to be displayed in a GUI generated by the block module. The additional details may include, by non-limiting example, the percent gain or loss that the block is currently experiencing, or the date upon which the block was created. The block module may also present an option with the blocks 56 in a GUI to, by non-limiting example, merge the block with any other block(s) selected or split the block into smaller block(s). The block module 32 or the tracking module 28 may also present an option to analyze the block's trade history and equivalency information to aid in trading decisions from the GUI displaying the blocks 56. The block module 32 or the trade module 34 may also present the option to initiate a trade of the block from the GUI displaying the blocks 56.

In various implementations, the block module is configured to split or divide blocks, upon a request from the user, into smaller or child blocks. In various implementations, the block module may also be configured to merge blocks into larger or parent blocks of a common asset. In various implementations, upon connecting an exchange or brokerage with the computing platform(s) 4 of the system 2 (as illustrated by FIG. 1), any holdings on the exchange or brokerage are immediately treated as new blocks with a "time entity" corresponding to the time the holding information was received by the computing platform(s) 4. Each new block is assigned a block ID. In various implementations, the block module 32 treats the holdings in each asset as blocks that can be split into smaller portions, or "child blocks," and traded as the user sees fit, while tracking each piece's activity and performance separately.

Figure 11:
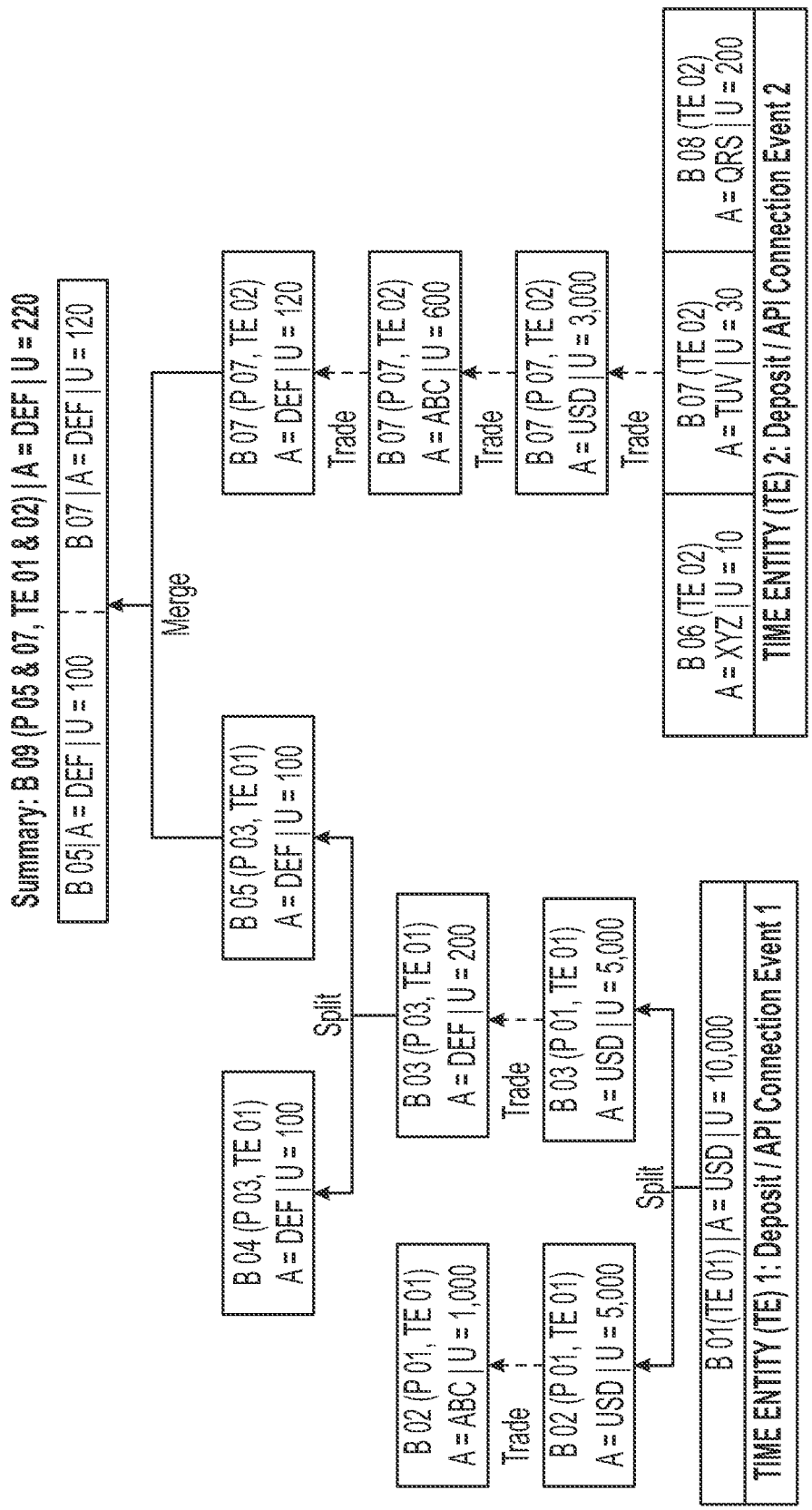
FIG. 11 is a diagram illustrating the splitting and merging of blocks.

In various implementations, the tracking module 28 or the block module 32 may track the movement of the child blocks behind the scenes and maintain a full record of which blocks were split and merged over time so that the true history and equivalency information can be accessible when needed. Referring to FIG. 11, a diagram illustrating the splitting and merging of blocks is illustrated. FIG. 11 illustrates an example of basic parent block-child block tracking by either the tracking module or the block module (or a combination thereof). Referring to FIG. 11, B=block ID which denotes the identifier added when each new block is created to assist in tracking value movement regardless of the asset vehicle occupied by the block at any point in time, TE="time entity" which denotes an origin block resulting from a deposit or new API connection to the system, P=parent ID which denotes the blocks from which new blocks are created via splits and merges to maintain tracking of lineage and original cost basis, A=the asset type, and U=units, or quantity of assets of each type in the block.

As illustrated by FIG. 11, the block module 32 not only allows blocks to be split into smaller components of the same holding of an asset but also to be merged into other blocks of the same asset. The tracking module 28 or the block module 32 tracks the history of each block's trades to maintain equivalent value references for any other asset the user wishes to evaluate and/or trade. In various implementations, additional considerations (such as the distinction between blocks that originate from the same "time entity" versus blocks merged from different time entities) for calculating data points relative to the individual components that comprise a merged block must also be made.

In the example illustrated by FIG. 11, two blocks of asset DEF (B05 and B07) were merged into one block (B09), resulting in 220 units of DEF. The blocks that comprise the new merged block, however, came from different time entities. For the sake of the example, it is assumed that "time entity" 2 came into the system sometime after "time entity" 1. As such, for the user to maintain data useful in determining the block's performance, each component's contributory values may be considered in two distinct ways. While the current market value for each contributory component may be calculated by multiplying the current pricing of the compared asset to which the block could be traded (the "to"

asset) by the unit count for each component, deriving a historical point of reference requires a different calculation. The values at the resulting block's inception, referred to as the "entry value", require the combination of independent "entry values" for each component at their respective points in time. As such, while merged blocks with different time entities have no singular "entry value" date and time, the "entry values" themselves represent true pricing at the time of calculating each component in the merged block. Therefore, this combined "entry value" provides a useful point of reference to allow the trader to maintain a basis from which to work and evaluate performance.

In various implementations, the system automatically assigns an "entry value" to a block based upon the time the block is generated. In other implementations, a user may be able to change the "entry value". This may be beneficial in instances where the user knows details of prior trades of the asset. In such implementations, the system (and in particular implementations, the tracking module) allows a user to edit and lock the "entry value"s. Once the edit is made, the tacking module 28 may initiate a recalculation of various elements of the position's metrics to reflect the updated values.

As illustrated by FIG. 11, block 05 originated from a "time entity" that had a value of $10,000 USD at the time of origination on the system. Block 05 was split twice prior to the merge and each split was an equal 50% of its parent block. This means that block 05 had an inception value of $2,500 USD. For the sake of the example, it is assumed that block 07 had a market value of $2,800 USD at the time of origination of its "time entity". The tracking module 28 may continue to maintain these reference points to maintain historical accuracy and to assist users in effectively tracking performance metrics so they can make informed trading decisions.

Figures 12, 13:
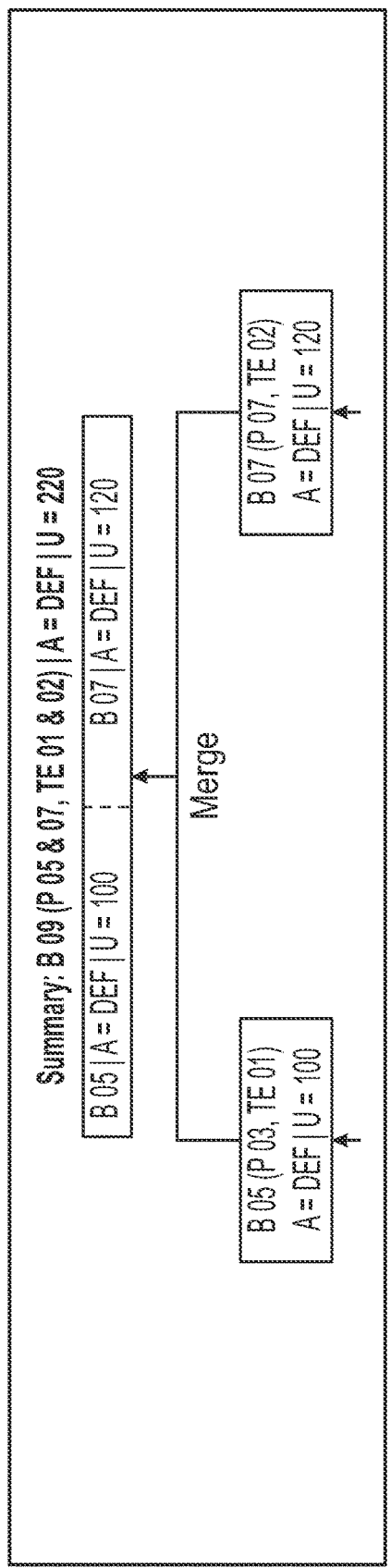
FIG. 12 is a diagram illustrating the merger of blocks of FIG. 10.
FIG. 13 is a table illustrating information associated with the merged block of FIG. 10.

Referring to FIG. 12, a diagram illustrating the merger of blocks of FIG. 10 is illustrated. Referring to FIG. 13, a table illustrating information associated with the merged block of FIG. 10 is illustrated. The example illustrated by FIGS. 12-13 demonstrates how the calculations maintained on the blocks that comprise the new merged block provide insight into the performance generated through unit accumulation (referred to herein as "portfolio growth"). This is compared to a buy-and-hold scenario (referred to herein as "value if held") where the user, rather than making the trades that culminated in the results of block 09, simply immediately bought and held the number of units in DEF that could have been purchased as of the date and time of the creation of the "time entity", given the "entry value"s noted at the time as well as the pricing of DEF at the time.

The "portfolio growth impact" (PGI) metric is calculated by measuring the difference between the current market value of the account and the value if held. It makes this calculation on a block-by-block basis and therefore adjusts to the current asset held in each specific block as trades of the block are made into different assets. Additionally, the entire portfolio's overall PGI metric is reflective of all of the individual blocks of assets held, and the proportions of those assets being held as they relate to the whole. Because of this, the PGI metric is dynamically changing with each trade and allows traders to evaluate the impact of their unit accumulation performance in real-time and on data tailored specifically to their portfolio.

Referring to FIG. 14, a table illustrating information associated with the merged block and a separate "to" asset is illustrated. In various implementations, the same logic applies to calculating performance in any other asset, given the relativity of pricing across assets, and can assist in tracking performance in an asset-to-asset trading scenario, allowing the user to continue seeking unit accumulation opportunities. FIG. 14 illustrates how the system maintains the equivalency values of other target, or "to", assets, allowing the user to assess the opportunity for unit growth and the impact of unit growth over the theoretical value if the user had simply bought and held the target asset with the same respective initial capital value per block at the time of each "time entity".

In various implementations, the block module 32 may be configured to operate in sequence mode and apply the profits or losses of sold blocks to other blocks of the same asset held by the user. In such implementations, the block module may provide a better understanding of a user's true exposure as trades of the same asset are opened and closed incrementally as blocks. In various implementations the ability to apply profits or losses from sold blocks to other blocks of the same asset may be turned off. In other implementations, the application of the profits or losses of sold blocks to other blocks of the same asset held by the user may be configured to be performed by the tracking module 28.

In various implementations the block module may be configured to generate a GUI mapping the history of a particular block. Referring to FIG. 15, a block map is illustrated. The block module 32 may be configured to generate a block map GUI having a block map 68 that displays the tracking or history of a particular block's 70 journey through the various assets that a trader buys and sells and to also display the equivalency in unit value of all other assets that a trader chooses to view at the time of each recorded trade of a block. The block map 68 illustrates the perpetual tracking of the flow of value as it moves through assets, while simultaneously mapping equivalency values of any other asset the user wishes to see, at the time of each trade. These values may be tracked by the tracking module. In such implementations, the block module 32 may be configured to allow a user to focus on "unit growth" by reallocating capital from higher priced assets to lower priced assets.

The block map 68 functionality is due at least in part to the concept that all assets are universally priced against one another and therefore, the volatility inherent in the process of price discovery provides an opportunity for unit growth as values of risk assets, relative to one another, are trackable and tradable. The block map 68 functionality may require fractional ownership of assets to facilitate a complete transfer of value between assets and a technically complete way for a trader to effectively break units of value within their holdings into smaller blocks of value and independently manage them more strategically.

In various implementations, as users add to their watchlists in the system, the block module 32, exchange module 26, or tracking module 28 may immediately gather all historical price points for each asset at the time of every trade of each block to which the asset is being added for review. This allows the user to review how much each trade could have generated in units of each asset. Users armed with this information may make more informed decisions when making their next trade by knowing if the trade generates growth in their portfolio over the resulting unit potential at the time of the last trade, the resulting equivalent unit potential from the blocks "entry value", the resulting maximum unit potential realizable in any particular asset, or any combination thereof.

As illustrated by FIG. 15, the diagram illustrates how a user with three risk assets (as well as fiat) in the watchlist develops a history of trades specific to a single block 70 in the user's portfolio and how that history informs the user about opportunities to grow units in any particular asset in the list, prior to executing the trade. By the time the user has reached the "Current" instance, the user has a choice to make between trading the holdings in Asset C into either Asset B for a gain of 165 units (or 17.9%) since the time of the last trade, or the option of taking a small unit loss of −50 units (or −3.9%) since the time of the last trade in Asset A. However, both Asset A and Asset B have experienced overall gains of 25% and 35% respectively, since the inception of the block. The user also has the option to exit into fiat for a gain of 1,500 units or 12.5% since the last trade. Having the ability to see these additional data points offered within the block map 68 offers the user much more latitude than simple asset to fiat-based performance tracking. Additionally, because the user has the ability to split the block and trade portions of it, the user may also elect to make all three available trades or some combination of them, allowing even greater flexibility.

Referring back to FIG. 1, the system may include a trade module. The trade module 34 may be configured to display trade information between two assets that share a market. The trade module 34 may be configured to allow a user to request a trade of a block or multiple blocks. Once the trade request is received by the trade module, the trade module may be configured to transmit a trade signal to a brokerage or exchange. Upon the trade being made, the tracking module may be configured to receive the trade information and track the block or blocks traded.

Figure 16:
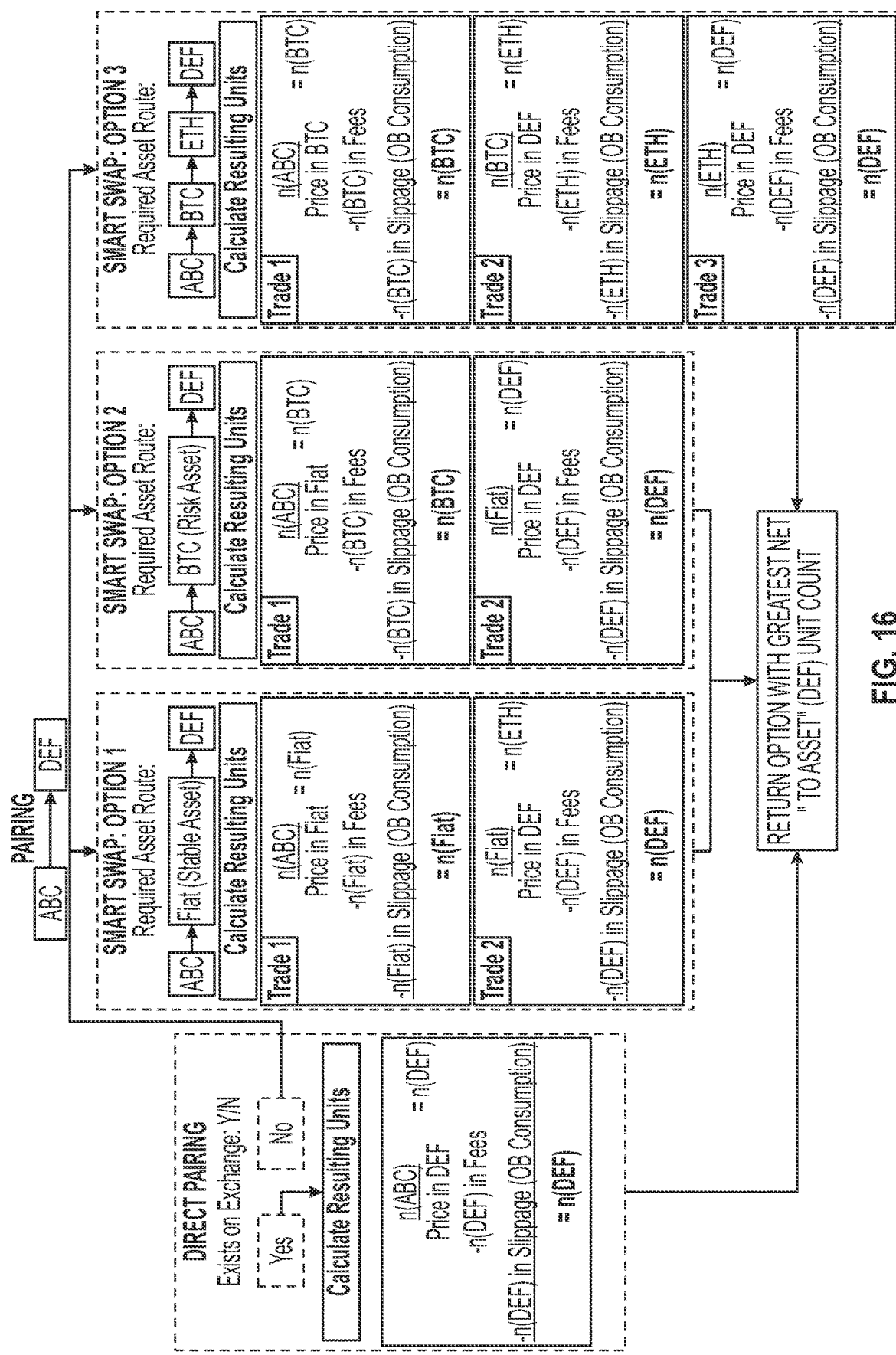
FIG. 16 is a chart illustrating trade routes.

In various implementations, a potential trade may be made between two assets that may be directly traded (such as Bitcoin and USD). In other implementations of the system disclosed herein, a user may be able to view the comparative values between two different assets that may not share a market. In such implementations, a user may still be able to request the trade between two assets not directly tradeable with one another through a "smart swap." In such implementations, the trade module may be configured to find one or more "medium" assets, or assets that share a market with both the "from" asset and the "to" asset, through which both assets in the pair can be traded. In such implementations, the trade module may be configured to calculate all possible trade routes and select the trade route that results in the most units of the "to" asset. Referring to FIG. 16, a chart illustrating trade routes is illustrated. In various implementations, direct pairing may be a possibility between the "from" asset and the "to" asset. In such implementations, the number of "to" assets may be calculated by dividing the number of "from" assets by the price of the "from" assets represented in units of the "to" asset. The fees and order book consumption of the trade, in numbers of "to" assets, may then be deducted to obtain the number of "to" assets. In implementations where a direct trade is not feasible, the trade module may evaluate various smart swaps. As illustrated by FIG. 16, the number of "to" assets in option one may be calculated by dividing the number of "from" assets by the price of the "from" assets represented in units of the "medium" asset (which is a stable asset, or a fiat in option 1). The fees and order book consumption of the trade, in numbers of "medium" assets, may then be deducted to obtain the number of "medium" assets. A second trade may then be evaluated where the number of "medium" assets is divided by the price of the "medium" asset represented in units of the "to" asset. The fees and order book consumption of the trade, in numbers of "to" assets, may then be deducted to obtain the number of "to" assets. Option 2 is similar to option 1 with the only difference being that the "medium" asset is a risk asset (in the case of option 2, bitcoin) rather than a fiat asset like USD. Option 3 is similar to option 2 except that three potential trades must be evaluated to find the total number of "to" assets. As illustrated by FIG. 16, the number of "to" assets in option 3 may be calculated by dividing the number of "from" assets by the price of the "from" assets represented in units of the first "medium" asset (BTC). The fees and order book consumption of the trade, in numbers of the first "medium" assets, may then be deducted to obtain the number of first "medium" assets. A second trade may then be evaluated where the number of first "medium" assets is divided by the price of the first "medium" asset represented in units of the second "medium" asset (ETH). The fees and order book consumption of the trade, in numbers of second "medium" assets, may then be deducted to obtain the number of second "medium" assets. A third trade may then be evaluated where the number of second "medium" assets is divided by the price of the second "medium" asset represented in units of the "to" asset. The fees and order book consumption of the trade, in numbers of "to" assets, may then be deducted to obtain the number of "to" assets.

In various implementations, after calculating all the different trade routes and determining the resulting number of "to" assets for each trade route, the trade module 34 may be configured to select the trade route that will result in the most units of the "to" asset obtained. The trade module may then be configured to transmit a trade request to a brokerage or an exchange to instigate one or more trades corresponding to the single trade request. The trade module may also submit a trade request to another brokerage or exchange (different from the brokerage or exchange that handled the first trade of the trade request) to instigate another trade that is part of the single trade request. In such implementations, the user may be able to essentially request a single trade and the trade module may be configured to execute multiple trades in order to fulfill the single trade requested by the user. In other similar implementations, the user may be able to make multiple trade requests and the trade module may be configured to execute more trades than there are trade requests in order to fulfill the single trade requested by the user. As an example, in various implementations a user may be able to request a limit order where they trade a percentage of a block at a first price and the remainder of the block at the second price. In such implementations, the trade module may be configured to execute multiple trades to fulfill the trade request for the percentage of the block at the first price and execute multiple trades for the remainder of the block at the second price.

In various implementations the tracking module may be configured to generate a GUI illustrating the performance of a user's trading.

While the systems disclosed herein are discussed as including both a matrix module and a block module, in various implementations the system may include just the matrix module or just the block module. In implementations including the block module, the block module may be configured to generate the blocks with the block map. In other implementations, the block module may be configured to generate the blocks without the block map.

Figure 17:
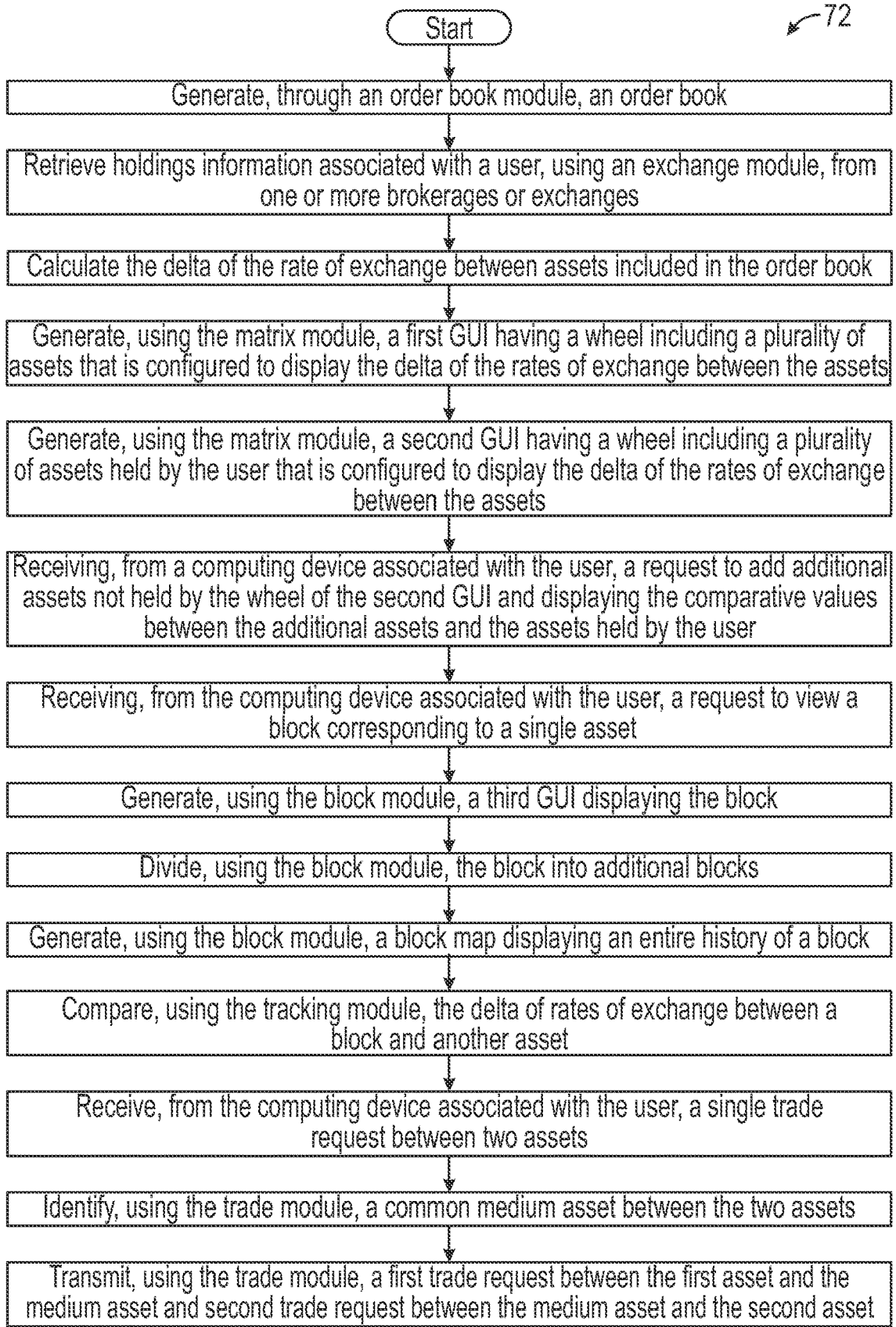
FIG. 17 is a flow chart illustrating a method implemented by the system of FIG. 1.

Referring to FIG. 17, the system disclosed herein may be used to perform the method of tracking an asset or trading an asset. Referring to FIG. 17, a process flow 72 of a method of tracking and trading an asset is illustrated. In various implementations, such a method may include generating, through an order book module, an order book. The method may also include retrieving holdings information associated with a user, using an exchange module and one or more APIs, from one or more brokerages or exchanges. Upon generating the order book and receiving the holdings information, the method may include calculating and/or tracking prices and the delta rate of exchange for any assets in the order book or assets held by the user. Upon calculating and/or tracking the prices and the deltas of the rate of exchange of the assets, the method may include generating, through a matrix module, a GUI having a matrix wheel including a plurality of assets that is configured to display the comparative values between the assets displayed. In various implementations, the method may also include generating another GUI having a matrix wheel including a plurality of assets held by the user that is configured to display the delta rate of exchange between the assets. The method may include receiving a request from a computing device associated with the user to add additional assets not held by the user to the matrix wheel including assets held by the user. The method may also include generating any other GUIs or features of GUIs that are described herein as generated by the matrix module.

In various implementations, the method of tracking and trading an asset may include receiving, from the computing device associated with the user, a request to view a block corresponding to a single asset. The block may be the same as any type of block disclosed herein. The method may also include, generating through the block module a third GUI displaying the block. The third GUI may include any elements disclosed herein including any information related to the block displayed. In various implementations the method may also include dividing the block, splitting the block or merging the block with other blocks of the same asset using the block module. The resulting calculations applied to the split or merged blocks may then carry over to the associated GUIs so the user can effectively evaluate the result of the action taken as the resulting block, or blocks, are compared to other assets in the user's watch list.

In various implementations the method of tracking and trading an asset may include generating, using the block module, a block map GUI displaying a history of a block. The history may include any piece of information related to the block, including the journey of the block through various assets as well as the equivalency in unit value of all other assets the user chooses to watch at the time of each recorded trade. In various implementations the block map GUI may include any other piece of information disclosed herein.

In various implementations the method of tracking and trading an asset may include comparing, using the tracking module, deltas of the rates of exchange between a block and another asset. In various implementations, a user may request a trade between the block asset (or in this case, the "from" asset) and the other asset (or in this case, the "to" asset). If there is a shared market between the "from" asset and the "to" asset, the method may include transmitting a trade request from the trade module to a brokerage or exchange to execute the trade requested by the user. In implementations where the "from" asset and the "to" asset do not share a market, the method may include searching for and selecting a "medium" asset by the block module. In implementations where multiple "medium" assets exist, the method may include automatically selecting the "medium" asset that will result in the greatest number of "to" assets. In such implementations, in response to the user requesting a trade between the "from" asset and the "to" asset, the block module may select the "medium" asset and transmit a trade request to a brokerage or exchange between the "from" asset and the "medium" asset. The block module may also transmit a second trade request to a brokerage or exchange that may or may not be the same brokerage or exchange that just executed the trade between the "from" asset and the "medium" asset. The second trade request is between the "medium" asset and the "to" asset. In such implementations, while the user submitted a single trade request, the module instigated multiple trades to fulfill the single trade.

In various implementations, once the trade is made, the tracking module may track the made trade and the system may reflect the trade just made.

In the various implementations of the systems and methods disclosed herein, a user may be capable of directly comparing deltas of the rates of exchange or other pricing information of any two assets. Further, the user may be capable of viewing and working with select blocks of an asset that represent only a fraction of the total asset owned. These select blocks have values that are dependent on the time the particular block was purchased. In turn, a user may be able to compare the delta rate of exchange of a particular block with another asset and trade the block, or only a portion, of the asset to optimize unit gain of assets that would otherwise not be possible without the equivalency tracking provided by the implementations herein.

Implementations of the systems and methods disclosed herein provide for more visibility into asset-to-asset-based trading opportunities and a more granular presentation of the positions that users acquire in various assets over time. By simply seeing opportunities to trade one asset for another, to gain more units of the target asset than was previously achievable, users can benefit by unlocking value in portions of their portfolio to grow their holdings in the assets they wish to own, without necessarily having to invest more fiat to do so. Users will benefit from new opportunities to exit positions into other assets, rather than hoping to perfectly time entries and exits, and simply taking fiat-based profit or stop losses. The system and method disclosed herein allows for traders and investors, armed with more information on each position, to incrementally enter and exit positions as opportunities present themselves. The system and methods disclosed herein may also benefit service providers as it will drive more activity on their platforms regardless of market conditions as investors become more active in growing their portfolios and traders employ new loss mitigation techniques.

The system and methods disclosed herein permit the user to view and treat their individualized positions in assets in their connected brokerage and exchange accounts, as inventory that can, itself, be treated as trading capital. Additionally, the systems and methods disclosed herein expand market visibility and provide tracking tools that provide information specific to the user rather than generic market information.

In places where the description above refers to particular implementations of asset tracking and trading systems and implementing components, sub-components, methods and sub-methods, it should be readily apparent that a number of modifications may be made without departing from the spirit thereof and that these implementations, implementing components, sub-components, methods and sub-methods may be applied to other asset tracking and trading systems.

What is claimed is:

1. A system for tracking and trading assets, the system comprising one or more processors configured to perform one or more operations, the one or more processors comprising:

an order book module configured to generate an order book;

an exchange module configured to retrieve, through one or more application programming interfaces (API), holdings information associated with a user from one of a brokerage, an exchange, or a brokerage and an exchange;

a tracking module configured to calculate a delta of a rate of exchange between two assets recorded within the order book;

a matrix module configured to generate a first graphical user interface (GUI) comprising a matrix wheel, the matrix wheel comprising a first plurality of assets and configured to display the delta of a rate of exchange between two assets of the first plurality of assets;

a block module configured to generate one or more blocks, each block representative of an asset of the first plurality of assets; and a trade module configured to transmit a trade request to the one of the brokerage, the exchange, or the brokerage and the exchange;

wherein the trade module is configured to receive, from a user, a single trade request between a first asset and a second asset;

wherein the trade module is configured to calculate a plurality of trade routes between the first asset and the second asset through one or more "medium" assets;

wherein the trade module is configured to determine a trade route resulting in a greatest number of second assets;

wherein the trade module is configured to request a trade between the first asset and the one or more "medium" assets and also between the one or more "medium" assets and the second asset in order to execute the single trade request using the trade route resulting in the greatest number of second assets; and wherein each block of the one or more blocks is configured to merge with another block to form a parent block, wherein the value of the parent block is calculated based upon a value and origination time of each block within the parent block, wherein each block within the parent block is independently tracked after the parent block is formed.

2. The system of claim 1, wherein the delta rate of exchange is a rate of change of a trading price of assets over a specified period of time, between the assets.

3. The system of claim 1, wherein the block module is configured to generate a second GUI comprising a block map illustrating a trade history of the one or more blocks, wherein the trade history comprises a plurality of equivalency values between each block and the first plurality of assets.

4. The system of claim 1, wherein the matrix module is configured to generate a second GUI comprising a second wheel, the second wheel comprising a second plurality of assets.

5. The system of claim 1, wherein each block of the one or more blocks may be divided into child blocks, wherein a value of each of the child blocks is dependent upon when assets of the child blocks were purchased.

6. The system of claim 1, wherein the trade route resulting in the greatest number of second assets comprises a first trade between the first asset and a first "medium" asset, a second trade between the first "medium" asset and a second "medium" asset, and a third trade between the second "medium" asset and the second asset.

7. The system of claim 1, wherein the trade module is configured to subtract a cost of fees and order book consumption, in units of the second asset, when determining the trade route resulting in the greatest number of second assets.

8. A system for tracking and trading assets, the system comprising one or more processors configured to perform one or more operations, the one or more processors comprising:

an exchange module configured to retrieve, through one or more application programming interfaces (API), holdings information associated with a user from one of a brokerage, an exchange, or a brokerage and an exchange;

a tracking module configured to calculate a delta of a rate of exchange between two assets;

a block module configured to generate one or more blocks, each block representative of an asset held by the user; and a trade module configured to transmit a trade request to the one of the brokerage, the exchange, or the brokerage and the exchange;

wherein the trade module is configured to receive, from a user, a single trade request between a first asset and a second asset;

wherein the trade module is configured to calculate a plurality of trade routes between the first asset and the second asset through one or more "medium" assets;

wherein the trade module is configured to determine a trade route resulting in the greatest number of second assets;

wherein the trade module is configured to request a trade between the first asset and the one or more "medium" assets and also between the one or more "medium" assets and the second asset in order to execute the single trade request using the trade route resulting in a greatest number of second assets; and wherein each block of the one or more blocks is configured to merge with another block to form a parent block, wherein the value of the parent block is calculated based upon a value and origination time of each block within the parent block, wherein each block within the parent block is independently tracked after the parent block is formed.

9. The system of claim 8, wherein the delta rate of exchange is a rate of change of a trading price of assets over a specified period of time, between the assets.

10. The system of claim 8, wherein each block of the one or more blocks may be divided into child blocks, wherein a value of each of the child blocks is dependent upon when assets of the child blocks were purchased.

11. The system of claim 8, wherein the trade route resulting in the greatest number of second assets comprises a first trade between the first asset and a first "medium" asset, a second trade between the first "medium" asset and a second "medium" asset, and a third trade between the second "medium" asset and the second asset.

12. A method of tracking and trading assets using one or more processors executing operations, the method comprising:

using an order book module, generating an order book;

using an exchange module and one or more application programming interfaces (API), retrieving holdings information associated with a user from one of a brokerage server, an exchange server, or both the brokerage server and the exchange server;

calculating, through a tracking module, a delta of a rate of exchange between assets of the order book;

generating, through a matrix module, a graphical user interface (GUI) comprising a matrix wheel, the matrix wheel comprising a first plurality of assets and configured to display the delta rate of exchange between any two assets of the first plurality of assets;

generating, through a block module, one or more blocks, each block representative of an asset of the first plurality of assets;

receiving a single trade request from a user between a first asset and a second asset;

calculating, using a trade module, a plurality of trade routes between the first asset and the second asset through one or more "medium" assets;

determining, using the trade module, a trade route resulting in the greatest number of second assets; and transmitting a trade request corresponding to the trade route resulting in the greatest number of second assets, through a trade module, to one of the brokerage server, the exchange server, or both the brokerage server and the exchange server, the trade request comprising a first trade between the first asset and the one or more "medium" assets and a second trade between the one or more "medium" assets and the second asset;

wherein each block of the one or more blocks is configured to merge with another block to form a parent block, wherein the value of the parent block is calculated based upon a value and origination time of each block within the parent block, wherein each block within the parent block is independently tracked after the parent block is formed.

13. The method of claim 12, wherein calculating the delta rate of exchange comprises comparing a rate of change between assets over a specified time period.

14. The method of claim 12, wherein the trade request comprises trades at one of multiple brokerages, multiple exchanges, or a brokerage and an exchange.

15. The method of claim 12, further comprising dividing a block, through the block module, into two or more child blocks.

16. The method of claim 12, wherein the trade module subtracts a cost of fees and order book consumption, in units of the second asset, when determining the trade route resulting in the greatest number of second assets.

17. The method of claim 12, wherein the trade request comprises a trade between the first asset and a first "medium" asset, a trade between the first "medium" asset and a second "medium" asset, and a trade between the second "medium" asset and the second asset.

* * * * *